(12) United States Patent
Hunter

(10) Patent No.: US 6,375,840 B1
(45) Date of Patent: Apr. 23, 2002

(54) SOCKET-WRENCH REMOVABLE OIL FILTER

(76) Inventor: Robert D. Hunter, 2029 James Rd., Granville, OH (US) 43023

( * ) Notice: Subject to any disclaimer, the term of this patent is extended or adjusted under 35 U.S.C. 154(b) by 0 days.

(21) Appl. No.: 09/838,932

(22) Filed: Apr. 20, 2001

(51) Int. Cl.[7] ................................................. B01D 27/08
(52) U.S. Cl. .................. 210/232; 210/443; 210/DIG. 17
(58) Field of Search ................................. 210/232, 443, 210/DIG. 17

(56) References Cited

U.S. PATENT DOCUMENTS

| | | | |
|---|---|---|---|
| D136,961 S | | 1/1944 | Siemers |
| 3,197,029 A | | 7/1965 | Yelinek et al. |
| 3,224,585 A | * | 12/1965 | Scavuzzo et al. |
| 3,279,609 A | | 10/1966 | Francois |
| 3,473,666 A | * | 10/1969 | Humbert, Jr. |
| 4,004,476 A | * | 1/1977 | De Vrou |
| 4,253,134 A | * | 2/1981 | Barnaby |
| 4,364,829 A | * | 12/1982 | Atkins et al. |
| D309,974 S | | 8/1990 | Tannous |
| 4,982,629 A | | 1/1991 | Germain |
| 5,738,785 A | | 4/1998 | Brown et al. |

FOREIGN PATENT DOCUMENTS

JP          06-296809          * 10/1994

* cited by examiner

Primary Examiner—Thomas M. Lithgow

(57) ABSTRACT

A socket-wrench removable oil filter for making it easier for the user to remove an oil filter from one's vehicle. The socket-wrench removable oil filter includes an oil filter assembly having an oil filter member which includes a housing having top and side walls and being cylindrically-shaped and further having a plurality of finger-holding grooves being disposed therein and also having a slot being centrally-disposed in the top wall and being adapted to receive a portion of a socket wrench.

6 Claims, 1 Drawing Sheet

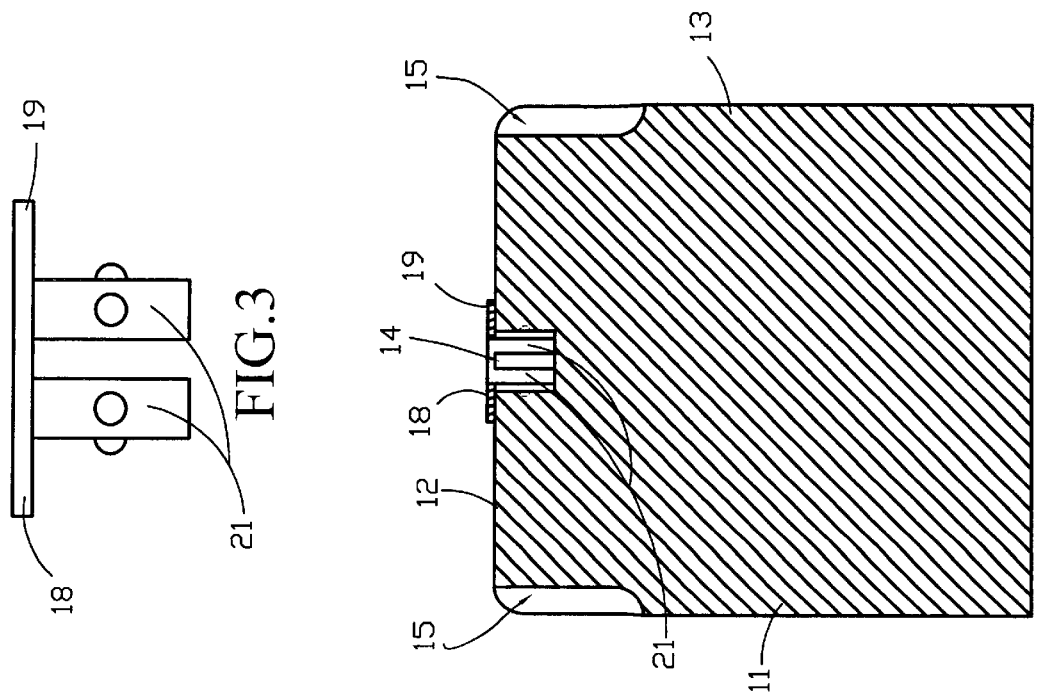
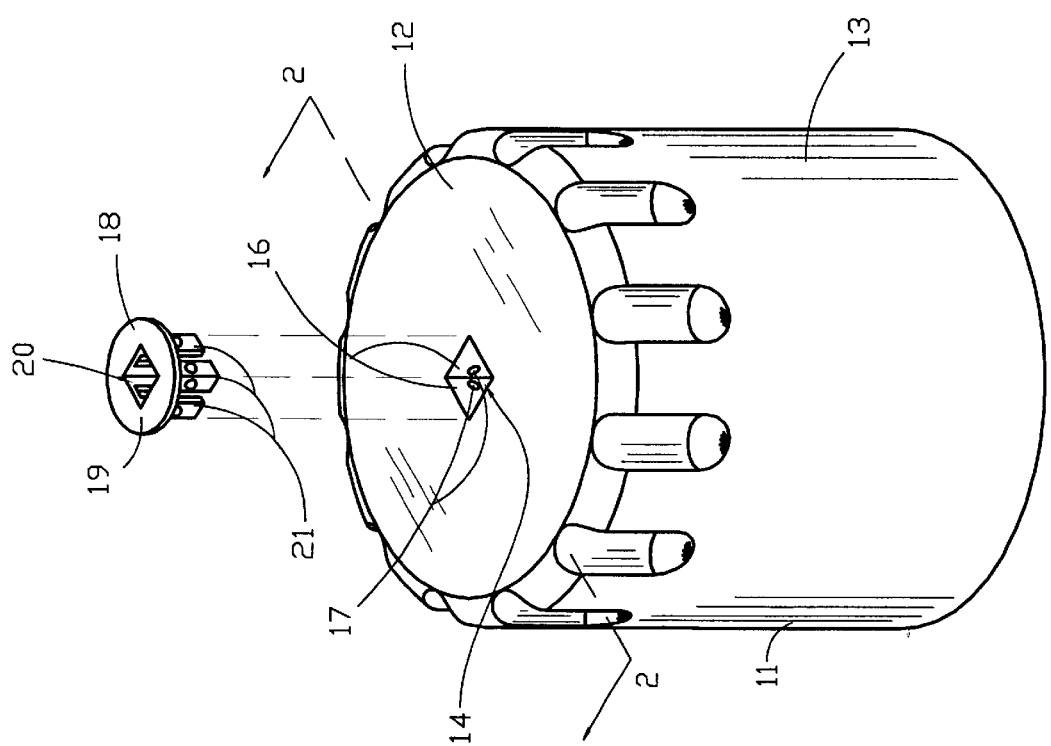

SOCKET-WRENCH REMOVABLE OIL FILTER

BACKGROUND OF THE INVENTION

1. Field of the Invention

The present invention relates to socket removable oil filters and more particularly pertains to a new socket-wrench removable oil filter for making it easier for the user to remove an oil filter from one's vehicle.

2. Description of the Prior Art

The use of socket removable oil filters is known in the prior art. More specifically, socket removable oil filters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,738,785; U.S. Patent No. Des. 309,974; U.S. Pat. No. 4,982,629; U.S. Pat. No. 3,279,609; U.S. Pat. No. 3,197,029; and U.S. Pat. No. Des. 136,961.

While these devices fulfill their respective, particular objectives and requirements, the aforementioned patents do not disclose a new socket-wrench removable oil filter. The inventive device includes an oil filter assembly having an oil filter member which includes a housing having top and side walls and being cylindrically-shaped and further having a plurality of finger-holding grooves being disposed therein and also having a slot being centrally-disposed in the top wall and being adapted to receive a portion of a socket wrench.

In these respects, the socket-wrench removable oil filter according to the present invention substantially departs from the conventional concepts and designs of the prior art, and in so doing provides an apparatus primarily developed for the purpose of making it easier for the user to remove an oil filter from one's vehicle.

SUMMARY OF THE INVENTION

In view of the foregoing disadvantages inherent in the known types of socket removable oil filters now present in the prior art, the present invention provides a new socket-wrench removable oil filter construction wherein the same can be utilized for making it easier for the user to remove an oil filter from one's vehicle.

The general purpose of the present invention, which will be described subsequently in greater detail, is to provide a new socket-wrench removable oil filter which has many of the advantages of the socket removable oil filters mentioned heretofore and many novel features that result in a new socket-wrench removable oil filter which is not anticipated, rendered obvious, suggested, or even implied by any of the prior art socket removable oil filters, either lone or in any combination thereof.

To attain this, the present invention generally comprises an oil filter assembly having an oil filter member which includes a housing having top and side walls and being cylindrically-shaped and further having a plurality of finger-holding grooves being disposed therein and also having a slot being centrally-disposed in the top wall and being adapted to receive a portion of a socket wrench.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new socket-wrench removable oil filter which has many of the advantages of the socket removable oil filters mentioned heretofore and many novel features that result in a new socket-wrench removable oil filter which is not anticipated, rendered obvious, suggested, or even implied by any of the prior art socket removable oil filters, either alone or in any combination thereof.

It is another object of the present invention to provide a new socket-wrench removable oil filter which may be easily and efficiently manufactured and marketed.

It is a further object of the present invention to provide a new socket-wrench removable oil filter which is of a durable and reliable construction.

An even further object of the present invention is to provide a new socket-wrench removable oil filter which is susceptible of a low cost of manufacture with regard to both materials and labor, and which accordingly is then susceptible of low prices of sale to the consuming public, thereby making such socket-wrench removable oil filter economically available to the buying public.

Still yet another object of the present invention is to provide a new socket-wrench removable oil filter which provides in the apparatuses and methods of the prior art some of the advantages thereof, while simultaneously overcoming some of the disadvantages normally associated therewith.

Still another object of the present invention is to provide a new socket-wrench removable oil filter for making it easier for the user to remove an oil filter from one's vehicle.

Yet another object of the present invention is to provide a new socket-wrench removable oil filter which includes an oil filter assembly having an oil filter member which includes a housing having top and side walls and being cylindrically-shaped and further having a plurality of finger-holding grooves being disposed therein and also having a slot being centrally-disposed in the top wall and being adapted to receive a portion of a socket wrench.

Still yet another object of the present invention is to provide a new socket-wrench removable oil filter that is easy and convenient to use.

Even still another object of the present invention is to provide a new socket-wrench removable oil filter that saves the user time and effort in removing one's oil filter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new socket-wrench removable oil filter according to the present invention.

FIG. 2 is a cross-sectional view of the present invention.

FIG. 3 is a side elevational view of the present invention.

DESCRIPTION OF THE PREFERRED EMBODIMENT

With reference now to the drawings, and in particular to FIGS. 1 through 3 thereof, a new socket-wrench removable oil filter embodying the principles and concepts of the present invention and generally designated by the reference numeral 10 will be described.

As best illustrated in FIGS. 1 through 3, the socket-wrench removable oil filter 10 generally comprises an oil filter assembly having an oil filter member which includes a housing 11 having top and side walls 12,13 and being cylindrically-shaped and further having a plurality of finger-holding grooves 15 being disposed therein and also having a slot 14 being centrally-disposed in the top wall 12 and being adapted to receive a portion of a socket wrench. The slot 14 has a plurality of side walls 16 and is generally quadrilaterally-shaped. The oil filter member further includes a plurality of dimples 17 being conventionally disposed in the side walls 16 of the slot 14 and being adapted to removably secure the socket wrench in the slot 14. Each of the dimples 17 is centrally-disposed in a respective side wall 16 of the slot 14. The finger-holding grooves 15 are spaced about a perimeter of the top wall 12 and are spaced about an upper portion of a circumference of the side wall 13 of the housing 11. The oil filter assembly further includes a support member 18 being engagably disposed in the slot 14 for strengthening the slot 14 during tightening and removal of the oil filter member. The support member 18 includes a ring member 19 having a plurality of finger-like projections 21 conventionally extending outwardly from a side of the ring member 19 and being spaced along an edge of a quadrilaterally-shaped hole 20 being disposed through the ring member 19. The finger-like projections 21 are disposed generally perpendicular to the ring member 19 and are in contactable relationship with the side walls 16 of the slot 14 of the oil filter member to strengthen the slot 14 when the oil filter member is being removed with the slot 14 having a depth of approximately ½ inch.

In use, the user inserts the drive member of the socket wrench in the slot 14 and turns the socket wrench to rotate and remove the oil filter member from the user's vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A socket-wrench removable oil filter comprising:

an oil filter assembly having an oil filter member which includes a housing having top and side walls and being cylindrically-shaped and further having a plurality of finger-holding grooves being disposed therein and also having a slot being centrally-disposed in said top wall and being adapted to receive a portion of a socket wrench; and a support member being disposed in said slot for strengthening said slot during tightening and removal of said oil filter member, said support member comprising a ring member having a plurality of finger-like projections extending outwardly from a side of said ring member, said finger-like projections being spaced along an edge of a hole formed through said ring member, said finger-like projections being disposed generally perpendicular to said ring member, said finger-like projections being contactable with said side walls of said slot of said oil filter member to strengthen said slot when said oil filter member is being removed.

2. A socket-wrench removable oil filter as described in claim 1, wherein said slot has a plurality of side wall.

3. A socket-wrench removable oil filter as described in claim 2, wherein said oil filter member further includes a plurality of dimples being disposed in said side walls of said slot and being adapted to removably secure the socket wrench in said slot.

4. A socket-wrench removable oil filter as described in claim 1, wherein said finger-holding grooves are spaced about a perimeter of said top wall and are spaced about an upper portion of a circumference of said side wall of said housing.

5. A socket-wrench removable oil filter comprising:

an oil filter assembly having an oil filter member which includes a housing having top and side walls and being cylindrically-shaped and further having a plurality of finger-holding grooves being disposed therein and also having a slot being centrally-disposed in said top wall and being adapted to receive a portion of a socket wrench;

wherein said slot has a plurality of side walls and is generally quadrilaterally-shaped;

wherein said oil filter member further includes a plurality of dimples being disposed in said side walls of said slot and being adapted to removably secure the socket wrench in said slot, each of said dimples being centrally-disposed in a respective said side wall of said slot;

wherein said finger-holding grooves are spaced about a perimeter of said top wall and are spaced about an upper portion of a circumference of said side wall of said housing;

wherein said oil filter assembly further includes a support member being disposed in said slot for strengthening said slot during tightening and removal of said oil filter member; and wherein said support member includes a ring member having a plurality of finger-like projections extending outwardly from a side of said ring member and being spaced along an edge of a quadrilaterally-shaped hole being disposed through said ring member, said finger-like projections being disposed generally perpendicular to said ring member and being in contactable relationship with said side walls of said slot of said oil filter member to strengthen said slot when said oil filter member is being removed.

6. A socket-wrench removable oil filter comprising:

an oil filter assembly having an oil filter member which includes a housing having top and side walls and being cylindrically-shaped and further having a plurality of finger-holding grooves being disposed therein and also having a slot being centrally-disposed in said top wall and being adapted to receive a portion of a socket wrench, said slot having a plurality of side walls and being generally quadrilaterally-shaped, said oil filter member further including a plurality of dimples being disposed in said side walls of said slot and being adapted to removably secure the socket wrench in said slot, each of said dimples being centrally-disposed in a respective said side wall of said slot, said finger-holding grooves being spaced about a perimeter of said top wall and being spaced about an upper portion of a circumference of said side wall of said housing, said oil filter assembly further including a support member being disposed in said slot for strengthening said slot during tightening and removal of said oil filter member, said support member including a ring member having a plurality of finger-like projections extending outwardly from a side of said ring member and being spaced along an edge of a quadrilaterally-shaped hole being disposed through said ring member, said finger-like projections being disposed generally perpendicular to said ring member and being in contactable relationship with said side walls of said slot of said oil filter member to strengthen said slot when said oil filter member is being removed, said slot having a depth of approximately ½ inch.

\* \* \* \* \*